US008578481B2

(12) United States Patent
Rowley

(10) Patent No.: US 8,578,481 B2
(45) Date of Patent: Nov. 5, 2013

(54) METHOD AND SYSTEM FOR DETERMINING A PROBABILITY OF ENTRY OF A COUNTERFEIT DOMAIN IN A BROWSER

(75) Inventor: Peter Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 986 days.

(21) Appl. No.: 11/549,828

(22) Filed: Oct. 16, 2006

(65) Prior Publication Data

US 2008/0092242 A1 Apr. 17, 2008

(51) Int. Cl.
G06F 11/00 (2006.01)
G06F 12/14 (2006.01)
G06F 12/16 (2006.01)
G08B 23/00 (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| 7,624,110 | B2 * | 11/2009 | Alagna et al. | 1/1 |
| 7,668,921 | B2 * | 2/2010 | Proux et al. | 709/206 |
| 2002/0099693 | A1 * | 7/2002 | Kofsky | 707/3 |
| 2005/0262210 | A1 | 11/2005 | Yu | |
| 2006/0041508 | A1 | 2/2006 | Pham et al. | |
| 2006/0069697 | A1 | 3/2006 | Shraim et al. | |
| 2006/0080437 | A1 * | 4/2006 | Lake | 709/225 |
| 2006/0123478 | A1 * | 6/2006 | Rehfuss et al. | 726/22 |
| 2006/0253584 | A1 | 11/2006 | Dixon et al. | |
| 2006/0294223 | A1 | 12/2006 | Glasgow et al. | |
| 2007/0128899 | A1 | 6/2007 | Mayer | |

FOREIGN PATENT DOCUMENTS

WO WO2004055632 7/2004

OTHER PUBLICATIONS

"Microsoft Phishing Filter: A New Approach to Building Trust in E-Commerce Content," accessed at http://www.microsoft.com/downloads/details.aspx?FamilyId=B4022C66-99BC-4A30-9ECC-8BDEFCF0501D&displaylang=en, published Sep. 20, 2005.
PCT International Preliminary Report on Patentability, PCT/US2007/022354 filed Oct. 19, 2007, mailed May 22, 2009.
International Search Report and Written Opinion of the International Searching Authority, PCT/US07/22354 filed Oct. 19, 2007, mailed Jun. 9, 2008, 11 pages.
International Search Report and Written Opinion of the International Searching Authority, PCT/US07/22354 filed Oct. 19, 2007, mailed Jun. 10, 2008, 10 pages.

(Continued)

Primary Examiner — Edan Orgad
Assistant Examiner — Harris Wang
(74) Attorney, Agent, or Firm — Lowenstein Sandler LLP

(57) ABSTRACT

Embodiments of the present invention provide a method and system for determining a probability that a suspected domain name of a domain accessed using a universal resource locator (URL), which can be entered as a character string into a browser associated with a client in a net environment, is a counterfeit of a legitimate domain name. Characters in the suspected domain name can be identified as known as likely to be deceptively substituted for corresponding legitimate characters of a legitimate domain name. An alternate domain name is generated by substituting predetermined characters with the corresponding legitimate characters. An attempt can be made to resolve alternate domains of the alternate domain names. If the names are successfully resolved, a non-zero probability is assigned to the suspected domain name as being counterfeit.

26 Claims, 6 Drawing Sheets

(56) References Cited

OTHER PUBLICATIONS

Red Hat, Inc. Non-Final Office Action for U.S. Appl. No. 11/595,414 (P030), mailed Jul. 22, 2009.
Red Hat, Inc. Final Office Action for U.S. Appl. No. 11/595,414 (P030), mailed Nov. 20, 2009.
Red Hat, Inc. Advisory Action for U.S. Appl. No. 11/595,414 (P030) mailed Jan. 29, 2010.
Red Hat, Inc. Non-Final Office Action for U.S. Appl. No. 11/595,414 (P030), mailed Sep. 27, 2011.
Red Hat, Inc. Final Office Action for U.S. Appl. No. 11/595,414 (P030) mailed Mar. 28, 2012.

* cited by examiner

METHOD AND SYSTEM FOR DETERMINING A PROBABILITY OF ENTRY OF A COUNTERFEIT DOMAIN IN A BROWSER

DESCRIPTION OF THE INVENTION

1. Field of the Invention

The present invention relates generally to security in a public network environment, such as the Internet, and more particularly, to determining a probability that a domain name entered in a browser is associated with a counterfeit of a legitimate domain.

2. Background of the Invention

As public computer networks are increasingly used for commerce and everyday communication, attempts to attack and defraud computer systems and computer users is also increasing. With the continuously increasing use of the Internet to conduct personal and business transactions, the level of the security threat from various sources is increasing. The open architecture of the Internet contributes significantly to the security threat environment.

The typical model for interaction using the Internet is for users or clients to access content made available through the so-called World Wide Web or simply the web. The web can be thought of as a global interactive information space. Information can be accessed through interaction between a user that is operating a software application known as a web browser or simply a browser on a local device or client and a particular website that the user wishes to access by way of the browser. A website is typically identified by unique global identifier referred to as a universal resource identifier (URI). The URI is generally entered into the browser as a character string, either manually through an input device such as a keyboard or automatically such that the content can be accessed.

A URI can be considered as a resource locator or a name of a resource or both, and generally has a universal resource locator (URL) as a component. A URL can be thought of as a URI identifying a resource and providing a means to obtain access to the resource itself, typically via the browser, by describing its network "location". By way of example, the URL "http://www.domainname.com/" identifies the location associated with "domainname" and provides access to a corresponding resource such as the home page of "domainname" when the text associated with the name is resolved by what is referred to as a domain name service or server (DNS). A name is resolved by a DNS when the DNS can find a corresponding 32 bit Internet Protocol (IP) address associated with the name, returning the address to the requesting entity. Alternatively, a browser may have the address previously stored and will perform a translation of the text into the IP address at which point the IP address is used by the browser to establish a virtual connection to the IP address such that packets can be transferred. It will be appreciated that the home page is made available by transferring characters encoded, for example, using the hypertext markup language (HTML) and transferred using the hypertext transfer protocol (HTTP) in packets to the browser. It should by noted that the term URI is generally preferred in technical publications such as standards produces by standards bodies such as the internet engineering task force (IETF). However, the term URL is still widely used. Many synonyms exist for URL or URI such as web address, or the like as will be appreciated.

In order to access content, a URL including a domain name can be manually entered as an alphanumeric character string into a browser or can be provided to the browser by way of a so-called "hyperlink" or simply "link", in an email, a document, a webpage, or the like. A link is a reference that, when activated, automatically instantiates a browser directed to access the content represented by the URL. Alternatively, activating the link transfers the character string representation of the URL information including a domain name to the already activated browser, which then accesses the referenced information when the DNS resolves the domain name and returns the actual IP address.

A variety of different types of malicious activity can be present in the typical network environment. Visits to certain Internet sites or websites can precipitate direct attacks or indirect attacks or other intrusions from spyware that is downloaded as part of the protocol exchange that occurs when sites are visited. A visit to a site can precipitate the embedding of a small application or other code or script in a user's computer system that can be activated to surreptitiously collect personal information from known repositories, report keystroke activity, or the like, and can transfer the information out of the user's system through the network connection back across the Internet to a location that is accessible to the fraudster.

One particularly troublesome attack the lures many unsuspecting users into relinquishing personal information is a type of attack that involves luring users to alternate sites from the sites they intended to visit. Such an attack is frequently used to facilitate information fishing or, more simply, as "phishing." Phishing is considered a malicious and potentially criminal activity that relies on social vulnerabilities and pretense to trick users into providing sensitive information. In a phishing attack, an attempt is made to fraudulently acquire sensitive information by appearing as a trustworthy source. While phishing can take many forms, one particularly troublesome form involves an attempt to lure a user to a counterfeit website using a URL associated with a domain names that appears similar to a trusted website but differs slightly from the legitimate domain name. The counterfeit website can be accessed in a number of ways. For example, the user can mistype a URL associated with the name of a legitimate website into a browser whereupon the phishing site is inadvertently accessed. In such a case, the phisher will have registered one or more domains that contain common misspellings of the legitimate site. In other cases, the phishing site can be provided in a link that appears to be directed to a legitimate site, but contains, for example, a substitute character, such as a numeral "1" in place of a lower case L or "l," a numeral "0" in the place of the letter "O," or the like. Further, some character pairs can be represented by one character, such as the "æ" character (UNICODE 00E6), which can be used to represent an "a" and an "e." Similarly, two characters can be used to represent a single character such as two "v" characters "vv" being used to represent a single "w" character. However the phishing attack is carried out, the resulting access to the counterfeit site associated with the suspected URL can have devastating consequences. For example, if a password or other sensitive information such as credit card information is requested, the counterfeit site can collect passwords or sensitive information from unsuspecting users and use the information for various forms of malfeasance. In a more extreme example, enough personal information could be collected by the phishing site to enable a fraudster to commit identity theft.

Some solutions exist to mitigate phishing attacks such as maintaining an exhaustive list of suspected phishing sites. Fore example, in version 7 (IE7), the next-generation of the browser known as the Internet Explorer, from Microsoft Corporation of Redmond Wash. will be provided with the phishing filter as described in the white paper entitled "Microsoft Phishing Filter: A New Approach to Building Trust in E-Commerce Content," Jul. 14, 2005. The proposed phishing filter will compare a URL to determine whether or not the corresponding website is a reported phishing site. The proposed phishing filter will check the address of the website on a proprietary server to see if it has been reported as a phishing site.

If a site is encountered that uses common phishing tactics but isn't listed on the server as a known phishing site, it can be reported. The potential phishing site will be evaluated and added to the list of reported sites on the server. The evaluation is performed remotely at the proprietary server. The phishing filter of IE7 uses a machine learning filter and heuristics to determine if a particular web site looks suspicious by looking for characteristics in the page that are common in phishing scams.

However, obvious problems are associated with such approaches in that a comprehensive list of URLs associated with phishing sites must be tediously maintained and updated as new sites are discovered. The resulting list would be prohibitively large and therefore would be prohibitive to transfer, store and update, particularly on modestly equipped computers and therefore requires maintenance on a central sever. Further, the reduction in access speed associated with checking a URL entered into the browser against the list prior to DNS resolution of the URL could render the browser undesirably slow. Also, based on the maintenance of the list on a proprietary server, problems can arise in that since the heuristics of the phishing filer are based on a learning machine, actual phishing sites may not be flagged as suspicious while legitimate sites could be marked as suspicious. Delay in updating the server could leave users vulnerable for periods of time while preventing user access to legitimate content.

Accordingly, a method of mitigating against phishing attacks and thereby avoiding the adverse consequences associated therewith would be appreciated in the art. Such an approach would preferably involve minimal reduction in access speed and overcome the limitations posed by existing approaches.

While a background including problems in the art are described hereinabove, with reference to related art or concepts associated with the present invention, the description is not intended to be limiting since the features of the present invention are set forth in the description which follows. Aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
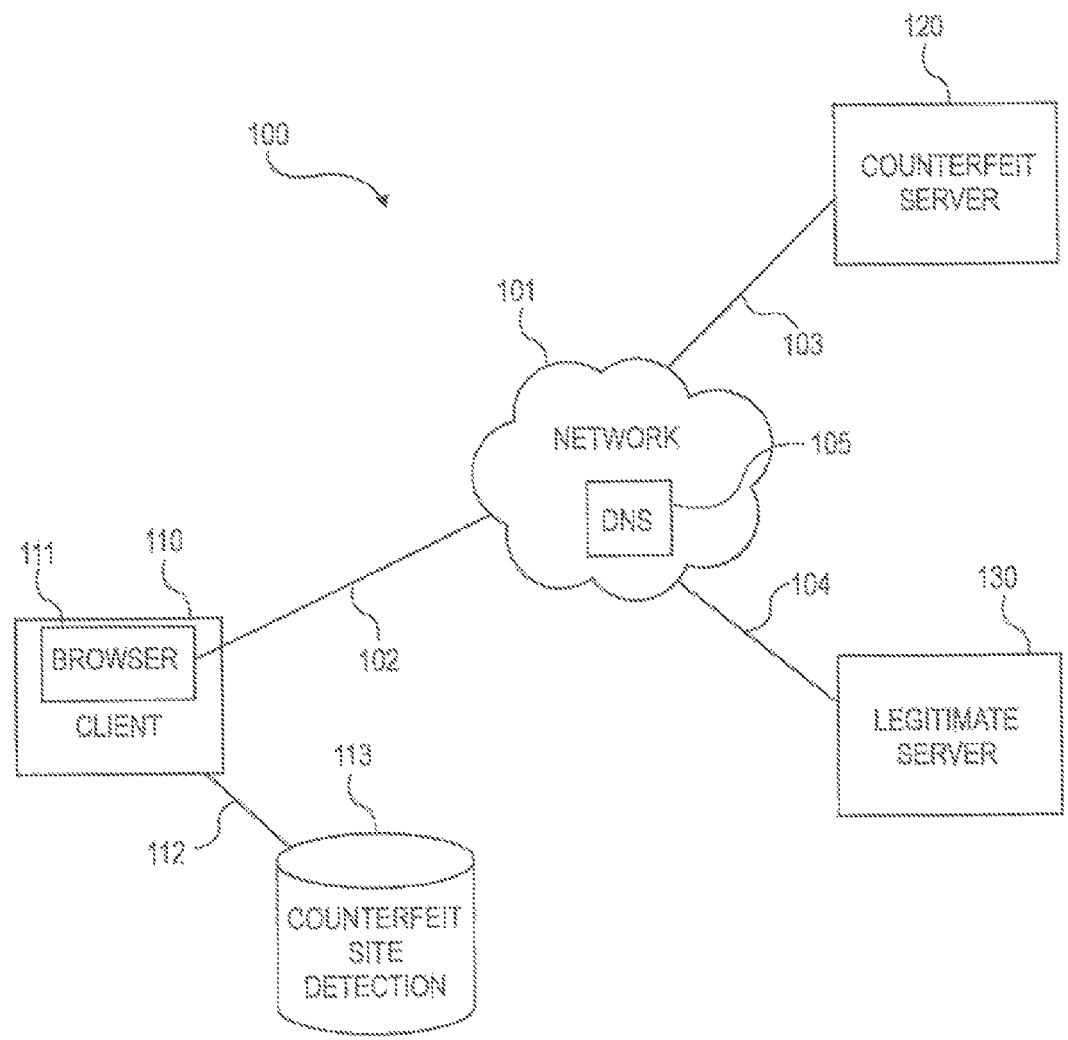
FIG. 1 is a diagram illustrating exemplary components of a computer system consistent with embodiments of the present invention.

Embodiments of the present invention provide a method and system for determining a probability that a suspected domain name associated with a suspected domain is a counterfeit of a legitimate domain name. The suspected domain can be accessed using a universal resource locator (URL) including the suspected domain name entered as a character string into a browser associated with a client in a network environment. It will be appreciated that the domain name portion of the URL is entered as the character string into the browser associated with the client in the network environment through one of a manual entry from a keyboard and an automatic entry from a hyperlink.

In accordance with an exemplary procedure, a first character string associated with the suspected domain name and entered into the browser is parsed to determine the alphanumeric characters that make up the string. Predetermined ones of the alphanumeric characters in the suspected domain name can be identified as having a known likelihood of being deceptively substituted for corresponding legitimate characters associated with the legitimate domain name.

An alternate domain name or domain names can be generated by substituting the predetermined characters with the corresponding legitimate characters, e.g., to form combinations and permutations of the domain name based on the various substitutions of the predetermined characters that are identified. An attempt is made to resolve the alternate domains associated with the alternate domain names generated as described. If any of the alternate domain names are successfully resolved, a non-zero probability is assigned to the suspected domain name as being counterfeit. It will be appreciated that in some embodiments, assigning a non-zero probability can include setting a threshold based on the ability to resolve alternate domains are part of a multi-step approach. In other words, if at least one or possibly more of the alternate domains can be resolved a first threshold alert level can be assigned or invoked.

In accordance with other embodiments, information associated with a page of the suspected domain and corresponding information associated with a corresponding page of the alternate domain, provide the alternate domain name can be resolved, can be compared and a similarity between the suspected page and the corresponding page from the alternate domain based on the comparison of the information from respected pages. A probability or likelihood can be developed or assigned to the suspected page to indicate that the suspected domain is a counterfeit domain of an actual domain based on the computed similarity. It will be appreciated that the comparison can include extracting information such as hypertext markup language (HTML) text from the page of the suspected domain and HTML text from the corresponding page of the actual domain to generate respective word lists. Alternatively, coded information can be stripped out for simplicity. The computing can then include comparing word counts associated with the word lists. In some cases, the assigned likelihood is increased if the suspected domain includes a request for input of information such as a password or other sensitive and/or personal information including social security number, date of birth, or the like.

In still other embodiments an exemplary procedure can be provided for determining a predetermined threat level of a suspected domain. The suspected domain can be accessed using a URL including a suspected domain name portion that is entered as a character string into a browser associated with a client in a network environment. The threat level is determined local to the client prior to access to the suspected domain.

In accordance with the procedure, a first character string associated with a suspected domain name of the suspected domain is entered into the browser either manually or automatically. The predetermined threat level of the suspected domain name is assigned or determined based on a locally-executed procedure that evaluates various criteria associated with the first character string. The predetermined threat level corresponds to a threat that the suspected domain is a counterfeit. The locally-executed procedure includes as a first evaluation criteria, identifying a predetermined character in the first character string having a known likelihood of being deceptively substituted for a corresponding legitimate character associated with a legitimate domain name. An alternate domain name can be generated by substituting the predetermined character with the legitimate character whereupon an attempt to resolve an alternate domain associated with the alternate domain name can be made. A first threat level is assigned as the predetermined threat level if the alternate domain name is successfully resolved.

The locally-executed procedure can further include as a second evaluation criteria, comparing information associated with a page of the suspected domain and corresponding information associated with a corresponding page of the alternate domain. A similarity between the pages can be calculated based on the comparison of the information from the pages. A second threat level can be assigned as the predetermined threat level based on the computed similarity. In other words a high degree of similarity will trigger a second threat level, whereas dissimilarity between the content will generally indicate a non-counterfeit site. The locally-executed procedure can still further include as a third evaluation criteria, determining whether the suspected domain includes a request for input of information including a username, a password, a credit card number, an account number, a date of birth, a social security number, a full name or the like. A third threat level can be assigned as the predetermined threat level based on the request for information. In other words, if the suspected site is asking for sensitive information, the threat level can be elevated to a third level.

In accordance with still another embodiment of the invention, an exemplary client is provided in a computer network having a domain name server (DNS). The client interacts with domains in the computer network and includes a network connection to the computer network and an application such as a browser which can be coupled to the network connection through an appropriate driver or the like. The browser can be configured to compare a first character string corresponding to at least a domain name portion of a URL associated with a suspected domain. The browser can determine an alternate domain associated with the suspected domain by forming a second character string using a character substitution procedure. The first character string and a second character string can be submitted to the DNS to be resolved. A first likelihood that the suspected domain is a counterfeit of an actual domain is assigned if the DNS can resolve the second character string.

In alternate embodiments, the browser is configured to retrieve a first web page associates with first character string and the suspected domain and a second web page associated with the second character string and the alternate domain. The first web page and the second web page can be compared and a second likelihood that the suspect domain is a counterfeit domain of the actual domain can be assigned based on the comparison. The exemplary client can include a database wherein the browser can store to the suspected web page and the determined probability.

In accordance with still other embodiments, an article of manufacture can be provided, which includes a computer readable medium such as a storage medium, which could be an optical disk or the like or could even be a network connection to the Internet with can be thought of as a computer readable medium. Instructions can be contained on the medium, which are readable by a processor, and can cause the processor to detect a universal resource locator (URL) including a suspected domain name input in a browser, the URL having a suspected alphanumeric character string identifying the input suspected domain name. The processor can generate alternative alphanumeric character stings associated with alternate domain names by substituting non-standard characters appearing in the suspected alphanumeric character string with predetermined standard characters and resolving the resulting alternative domain names to determine if any of the alternate domain names are associated with a legitimate domain. Finally, the processor can assign a probability that the input suspected domain name is associated with a counterfeit domain if the any of the alternate domain names are associated with the legitimate domain.

Reference will now be made in detail to exemplary embodiments of the invention, which are illustrated in the accompanying drawings. Wherever possible, the same reference numbers will be used throughout the drawings to refer to the same or like parts.

Referring now to FIG. 1, a simplified and representative client-browser network environment 100 associated with a computer network will be discussed and described. The basic representative environment includes a client 110, a network 101, a counterfeit server 120 and a legitimate server 130. The counterfeit server 120 and the legitimate server 130 can be connected to the network 101 through connections 103 and 104 respectively. The client 110 is connected to network 101 through connection 102, which can be any one of a number of different types of wired or wireless connections as would be appreciated in the art. The client 110 can be configured with an application referred to as a web browser or simply browser, such as a browser 111. It will be appreciated that the browser 111 can be connected to the network 101 by way of the connection 102 and any software modules or software drives executing on the processor hardware of client 110, which modules or drivers are necessary to conduct the low level communication functions, which ideally are transparent to the browser 111. The client 110 can also optically be connected to a storage device 113 through a connection 112 which can be a local connection such as a bus or the like. The storage device 113 can be used to store information associated with the counterfeit site detection.

The browser 111 is for managing requests for access to and displaying content of various domains or websites using the hardware resources of the client 110. The content is accessible by entering character strings associated with domain names of the domains associated with the content. The character strings associated with domain names can be entered into the browser 111 by a keyboard or other alphanumeric input device, through a pointing device operating on a virtual keyboard, or any other means of inputting information as are well known and thus not shown. The character strings can also be input by the operations of hypertext links which, when activated by clicking thereon with a pointing device such as a mouse or the like, will transfer a character string into an active browser or will activate a new browser directed to the domain associated with the character string once the string is resolved through the operation of a DNS 105. Assuming the character string can be resolved, an Internet address is returned to the browser 111 whereupon a connection attempt is made to the internet address. When a successful connection is made, the content associated with the name/location is transferred to browser 111 and displayed under the control of the hypertext markup language (HTML) characters and other characters contained in the transmission and based on the capabilities of the hardware resources associated with the client 110, such as the display capabilities or the like.

Figure 2:
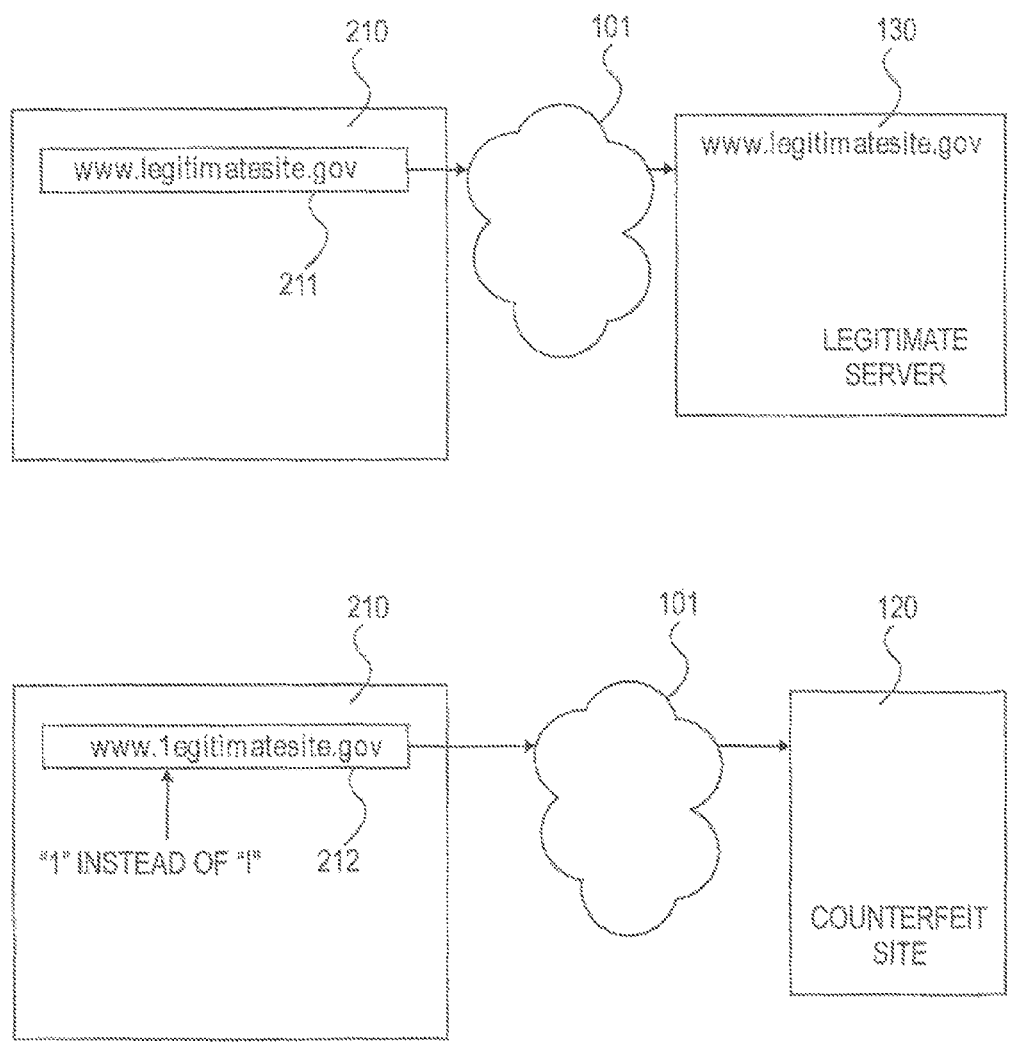
FIG. 2 is a diagram illustrating an exemplary client with a browser and examples of access to servers hosting legitimate and counterfeit websites consistent with operation in accordance with the present invention.

In a typical client 110, the browser 111 described in connection with FIG. 1 is shown and described in greater detail in connection with FIG. 2. In an exemplary client 210, a browser can be provided with a data entry field 211 in the browser window. The data entry field 211 can be used to directly enter a character string containing a domain name such as "www.legitimatesite.com" that will be sent to network 101 and the domain name portion resolved by the DNS 105 to connect to a domain associated with the Internet address returned by the DNS, in this case legitimate server 130. If a user enters a typographical error in the data entry field 211 of the browser, a counterfeit website corresponding to the common misspelling of the domain name can be set up to fool the unsuspecting user into providing personal information. In a more deceptive phishing attack however, a link to the phishing site can be provided in an email, website or other common location for links. The link can be set up such that certain characters of the domain name portion are carefully substituted for characters associated with the legitimate site. It will be appreciated that, while a common substitution would be for a lower case L or "l" to be substituted for a numeral 1, the expansion of the typical character set to a 64 bit UNICODE standard expands the universe of possible substitutions. In the data entry field 212, which has been populated with characters in connection with a phishing attack such as through a hyperlink contained in a malicious email, it can be seen that domain name portion of the character string "www.1egitimatesite.com" differs from the original domain name "legitimatesite.com" in that the lower case L has been changed to a numeral 1. If the corresponding phishing site is sufficiently identical in appearance to the genuine site, a user would probably not notice the minor change in the actual information entered into the data entry field 212 and would be more likely to comply with requests for sensitive information or the like. While replacing a lower case L with a numeral 1 represents a common substitutions many other substitutions are possible. Given the possibilities provided by the UNICODE character set, a character could easily be substituted for one of the multitudes of alternate character forms which most closely resemble the counterfeited character. It will be appreciated that in connection with the invention, rather than storing exhaustive lists of phishing sites, a list of commonly substituted characters can be stored for example in storage device 113, with periodic updates possible through the operating system vendor or other third party.

Figure 3:
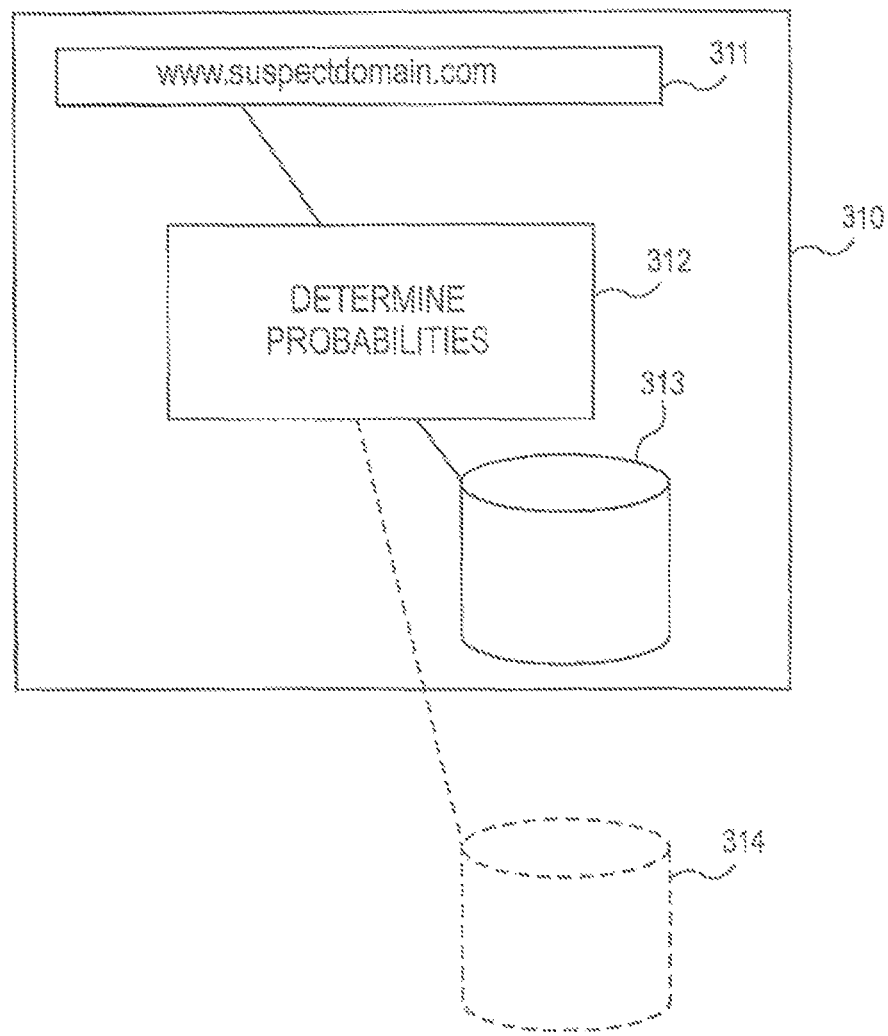
FIG. 3 is a diagram illustrating an exemplary client and browser determining a probability that a suspected domain is a counterfeit domain in accordance with embodiments of the present invention.

In accordance with various embodiments, an exemplary scenario is illustrated in FIG. 3 for determining the probability that a suspected domain is a counterfeit. A client 310 can include a data entry field 311 associated with a resident browser. When a URL including a domain name portion, such as "suspectdomain.com" is entered either manually or automatically in the data entry field 311, a procedure 312 can be activated to determine a probability, likelihood, threat level or the like, or a series of probabilities likelihoods, threat levels or the like that the domain name "suspecteddomain.com" in data entry field 311 corresponds to a counterfeit domain, phishing site or the like. Information associated with the domain name and the probabilities can be stored or otherwise logged or the like in local storage device 313 or external storage device 314. Also, as noted, common character substitutions and new character substitutions can be stored in the local storage device 313 or the external storage device 314. It will be appreciated that as domain names are associated with phishing sites, an analysis of which of the characters were substituted can be conducted and the characters added to the list of commonly substituted characters. The list can be maintained locally, and can also be transferred to a dedicated server associated with the operating system vendor or browser vendor. Updated character substitution lists can also be maintained by the vendor or browser vendor. Updated character substitution lists can also be maintained by the vendors and transferred periodically in browser/operating system updates.

Figure 4:
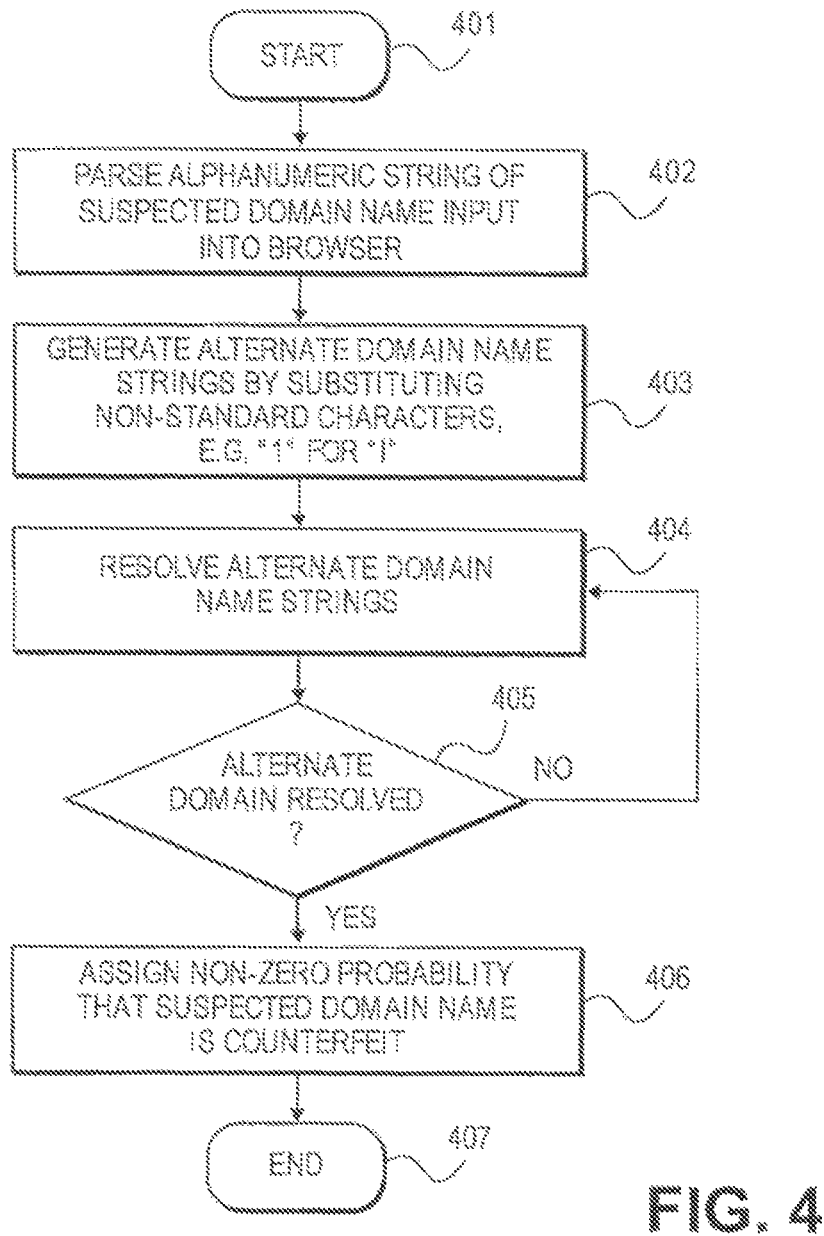
FIG. 4 is a flow chart illustrating an exemplary procedure for, inter alia, determining a probability that a suspected domain name is a counterfeit domain name in accordance with the present invention.

In accordance with other exemplary embodiments, in FIG. 4 an exemplary procedure is shown an described that can be used to accomplish, for example, phishing site detection. After start at 401, an alphanumeric string containing a domain name associated with a suspected domain that is either manually or automatically entered into a browser can be parsed at 402 to generate a text string that can be further analyzed, processed or the like as will be described. In the process of parsing, certain characters can be removed such as separators, as will be appreciated. The parsed string can then be processed to determine whether non-standard characters, such as embedded numerals, are present. For example, if a largely textural string contains an embedded numeral "1," then an alternate domain name can be constructed by generating a new character string in which a lower case L or "l" is substituted for the numeral "1." If more than one questionable character is present in the original parsed string, then several alternate domain names can be constructed for every combination and permutation of the substituted characters at 403. When all of the possible alternate domain names are constructed or perhaps when at least one of the alternate domain names are constructed, the alternate domain name or names can be resolved at 404.

If at least one of the alternate domain names is resolved at 405, then a non-zero probability can be assigned at 406 that the suspected domain name is counterfeit. It will be appreciated that in alternative embodiments, the resolution of the alternate domain name will represent a first criteria, which, when satisfied, will cause a first predetermined threat level to be activated or set, or a first security threat threshold to be crossed. If the alternate domain name is not resolved attempts to resolve other alternate domain names can be made or, if no other alternate domain names have been constructed, then the procedure can be set to an idle or a monitoring status. The procedure can then wait for an additional domain name to be entered into the browser, whereupon 402-404 can be repeated. While the exemplary procedure is indicated as ending at 407, it will be appreciated that the procedure can be set to an idle state, monitoring state, looping state, or the like, such that new domain name entries can be processed, for example, in accordance with 401-406.

Figure 5:
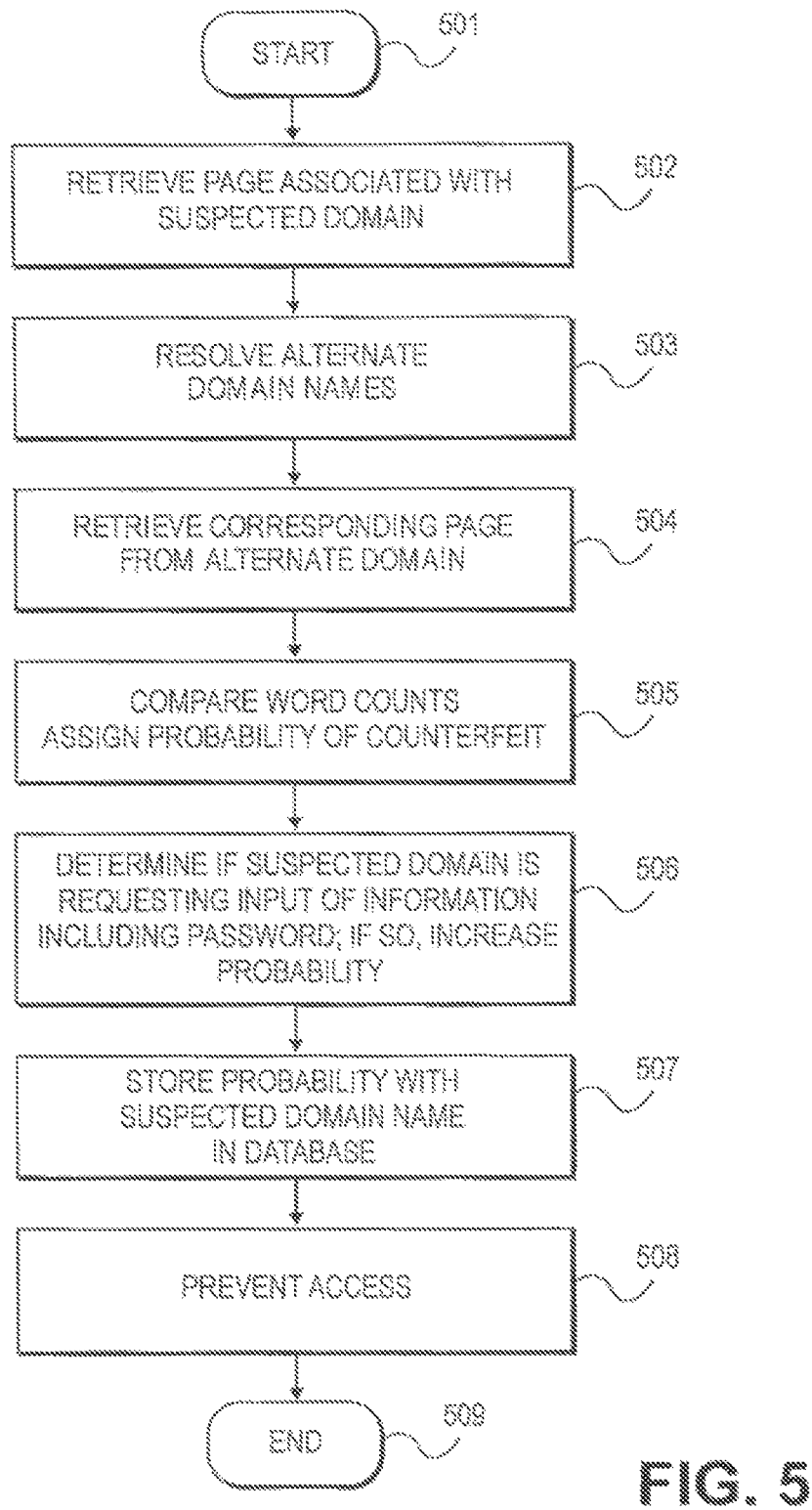
FIG. 5 is a flow chart illustrating an alternate exemplary procedure, inter alia, determining a probability that a suspected domain name is a counterfeit domain name in accordance with the present invention.

Another embodiment is shown and described, for example, in connection the exemplary procedure illustrated in FIG. 5. After start at 501, a web associated with the suspected domain is retrieved at 502, for example after resolving the domain name of the suspected domain. Alternate domain names can be generated and resolved at 503, such as, for example as described in connection with the procedure of FIG. 4. If ones of the alternate domain names can be resolved, then a page, preferably a page that corresponds as best can be determined to the page from the suspected domain is retrieved from the alternate domain or domains at 504. The exemplary procedure can then compare content from the respective pages by, for example, stripping HTML commands and the like from the page contents. The remaining text from each of the page from the suspected domain and the page from the alternate domain is compared, such as by word count, at 505 and non-zero probability assigned that the suspected domain name is a counterfeit. The assigned probability is preferably greater than the probability assigned based only on the ability to resolve the alternate domain name, for example as described in connection with 406 herein above. In alternative embodiments, the degree of similarity between the page from the suspected domain and the page from the alternate domain will represent a second criteria, which, when satisfied, will cause a second predetermined threat level to be activated or set, or a second security threat threshold to be crossed. Such a second criteria can be evaluated, especially when the procedure shown and described in connection with FIG. 4 and the procedure shown and described in connection FIG. 5 are at least partially combined. It will be appreciated that the procedure at 505 can be repeated for each alternate domain name that is constructed or generated at 503. A further determination can be made at to whether the suspected domain is requesting input at 506. If the suspected domain is requesting input such as password input, input of an account number or other sensitive information, an increased probability can be assigned that the suspected domain is counterfeit. In alternative embodiments, the request of input from the suspected domain will represent a third criteria, which, when satisfied, will cause a third predetermined threat level to be activated or set, or a third security threat threshold to be crossed, such as a "highest" threat level or the like. Such a third criteria can be evaluated, especially when the procedure shown and described in connection with FIG. 4 and the procedure at 505 can be repeated for each alternate domain name that is constructed or generated at 503. In some instances, the suspected domain name along with various threat levels or the like can be stored locally or centrally at 507, or alternatively, any new character substitutions that are encountered can be stored in a character list. In still other embodiments, access to the suspected domain can be prevented all together at 508. While the exemplary procedure is indicated as ending at 509, it can continue to run in a background mode in association with the browser or the like such that when any access attempts are made to web content, all or various portions of the exemplary procedure can be performed.

Figure 6:
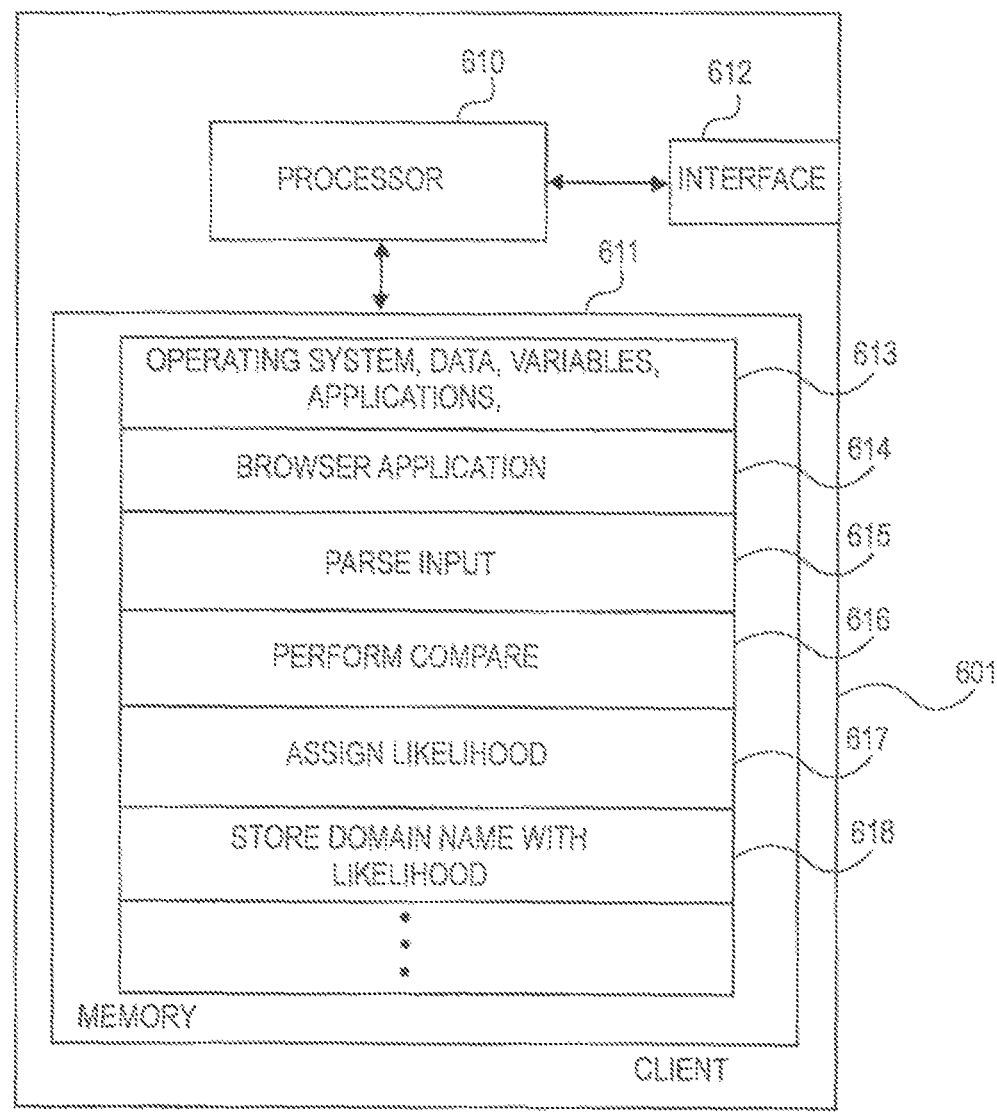
FIG. 6 is a block diagram illustrating portions of an exemplary client in accordance with the present invention.

In many embodiments, the exemplary procedures described herein can be implemented in an apparatus as shown in FIG. 6, which can be an exemplary computer such as a client 601 having a processor 610 configured to execute computer instructions stored in memory 611, or other computer readable medium, causing all or various portions of the procedure to be carried out. The memory 611 can store the usual information such as operating system software, data, variables, and applications, including the exemplary procedures, at 613. The client 601 can also be configured with an interface 612, which, when operating in connection with the processor 610 can be used to facilitate a network connection and exchange and transfer of information associated with web content as described herein with browser 614. As noted a character string associated with at least a domain name portion of a URL and input to the browser can be parsed at 615. The string can be input in any one of a number of conventional manners such as through transfer of keystrokes from a keyboard or other input device or process to the browser application or a sub-process thereof or associated with the operating system to handle the input string. In other words, an input process, such as that which would be invoked from the activation of a hypertext link can also be used to generate the input string in which case display of the input string may or may note be displayed immediately in the browser. In the case where the browser is not activated, a new instance of the browser can be activated upon activation of the hypertext link as will be appreciated. The domain name portion of the input string can be compared at 616 with alternate domain names, such as described above including comparing respective page contents and determining whether input is being requested. A likelihood or threat level or a series of threat levels, likelihood, thresholds or the like can be assigned at 617 indicating that the suspected domain represented by the input string is actually a counterfeit.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:

parsing a character string associated with the suspected domain name of the suspected domain to identify a character in the character string that has a known likelihood of being deceptively substituted for a corresponding legitimate character in a legitimate domain name of the legitimate domain wherein the generating comprising substituting the identified character with the corresponding legitimate character generating an alternate domain name from a suspected domain name;

submitting the alternate domain name to a domain name server for resolution;

when the alternate domain name is resolved, assigning, a first non-zero likelihood that the suspected domain name is a counterfeit of the legitimate domain;

retrieving, by the processor, a first webpage associated with the suspected domain name;

retrieving, by the processor, a second webpage associated with the alternate domain name corresponding to the first web page associated with the suspected domain name;

computing similarity between a first webpage associated with the suspected domain name and a second webpage associated with the alternate domain name, wherein the second webpage corresponds to the first web page associated with the suspected domain name;

in response to the computing, assigning, a processor, a second non-zero likelihood that the suspected domain name is a counterfeit of the legitimate domain, wherein the second non-zero likelihood is greater than the first non-zero likelihood:

determining that the first webpage comprises a request for input of personal information; and in response to the determining, assigning, by the processor, a third non-zero likelihood that the suspected domain is a counterfeit of the legitimate domain, wherein the third non-zero likelihood is greater than the second non-zero likelihood.

2. The method of claim 1
wherein the personal information comprises one or more of a username, a password, a credit card number, an account number, a date of birth, a social security number, and a full name.

3. The method of claim 1, wherein:
the computing comprises extracting first hypertext markup language (HTML) text from the first webpage of the and second HTML text from the second webpage to generate respective first and second word lists; and comparing word counts associated with the first and second word lists.

4. The method of claim 1, wherein the character string is entered into a browser associated with a client in a network environment through one of a manual entry from a keyboard and an automatic entry from a hyperlink.

5. The method of claim 1 further comprising:
determining the characters substituted in the suspected domain name to resemble the alternate domain name; and
communicating the substituted characters to a separate device for use in evaluating subsequent suspected domain names.

6. The method of claim 1, further comprising:
preventing access to the suspected domain name in response to the assigning the second non-zero likelihood.

7. A system comprising:
a memory including instructions; and
a processor, connected with the memory, to execute the instructions, the instructions cause the processor to:
parse a character string associated with the suspected domain name of the suspected domain to identify a character in the character string that has a known likelihood of being deceptively substituted for a corresponding legitimate character in a legitimate domain name of the legitimate domain
generate an alternate domain name from a suspected domain name; submit the alternate domain name to a domain name server for resolution;
when the alternate domain name is resolved, assign a first non-zero likelihood that the suspected domain name is a counterfeit of the legitimate domain;
retrieve a first webpage associated with the suspected domain name; retrieve a second webpage associated with the alternate domain name;
compute similarity between a first webpage associated with the suspected domain name and a second webpage associated with the alternate domain name, wherein the second webpage corresponds to the first web page associated with the suspected domain name; in response to the compute, assign a second non-zero likelihood that the suspected domain name is a counterfeit of the legitimate domain, wherein the second non-zero likelihood is greater than the first non-zero likelihood;
determine that the first webpage comprises a request for input of personal information; and in response to the determine, assign a third non-zero likelihood that the suspected domain is a counterfeit of the legitimate domain, wherein the third non-zero likelihood is greater than the second non-zero likelihood.

8. A non-transitory computer readable medium including instructions that, when executed by a processor, cause the processor to perform an operation comprising:
parsing a character string associated with the suspected domain name of the suspected domain to identify a character in the character string that has a known likelihood of being deceptively substituted for a corresponding legitimate character in a legitimate domain name of the legitimate domain
wherein the generating comprising substituting the identified character with the corresponding legitimate character
generating an alternate domain name from a suspected domain name;
submitting the alternate domain name to a domain name server for resolution;
when the alternate domain name is resolved, assigning, a first non-zero likelihood that the suspected domain name is a counterfeit of the legitimate domain;
retrieving, by the processor, a first webpage associated with the suspected domain name;
retrieving, by the processor, a second webpage associated with the alternate domain name corresponding to the first web page associated with the suspected domain name; computing similarity between a first webpage associated with the suspected domain name and a second webpage associated with the alternate domain name, wherein the second webpage corresponds to the first web page associated with the suspected domain name;
in response to the computing, assigning, a processor, a second non-zero likelihood that the suspected domain name is a counterfeit of the legitimate domain, wherein the second non-zero likelihood is greater than the first non-zero likelihood:
determining that the first webpage comprises a request for input of personal information; and in response to the determining, assigning, by the processor, a third non-zero likelihood that the suspected domain is a counterfeit of the legitimate domain, wherein the third non-zero likelihood is greater than the second non-zero likelihood.

9. The method of claim 1 further comprising:
when the alternate domain name is not resolved, generating, by the processor, one or more another alternate domain names from the suspected domain name and submitting the one or more another alternate domain names to the domain server for resolution.

10. The method of claim 9 further comprising:
when the alternate domain name and the one or more another alternate domain names are not resolved, monitoring, by the processor, for another suspected domain name.

11. The system of claim 7 further comprising:
when the alternate domain name is not resolved, generating, by the processor, one or more another alternate domain names from the suspected domain name and submitting the one or more another alternate domain names to the domain server for resolution.

12. The system of claim 11 further comprising:
when the alternate domain name and the one or more another alternate domain names are not resolved, monitoring, by the processor, for another suspected domain name.

13. The non-transitory computer readable medium of claim 8, the operation further comprises:
when the alternate domain name is not resolved, generating, by the processor, one or more another alternate domain names from the suspected domain name and submitting the one or more another alternate domain names to the domain server for resolution.

14. The non-transitory computer readable medium of claim 13, the operation further comprises:

when the alternate domain name and the one or more another alternate domain names are not resolved, monitoring, by the processor, for another suspected domain name.

15. The non-transitory computer readable medium of claim 8 wherein the personal information comprises one or more of a username, a password, a credit card number, an account number, a date of birth, a social security number, and a full name.

16. The non-transitory computer readable medium of claim 8 wherein the computing comprises extracting first hypertext markup language (HTML) text from the first webpage of the and second HTML text from the second webpage to generate respective first and second word lists; and comparing word counts associated with the first and second word lists.

17. The non-transitory computer readable medium of claim 8 wherein the character string is entered into a browser associated with a client in a network environment through one of a manual entry from a keyboard and an automatic entry from a hyperlink.

18. The non-transitory computer readable medium of claim 8 wherein the generating comprising substituting the identified character with the corresponding legitimate character.

19. The non-transitory computer readable medium of claim 18, the operation further comprises:
   determining the characters substituted in the suspected domain name to resemble the alternate domain name; and
   communicating the substituted characters to a separate device for use in evaluating subsequent suspected domain names.

20. The non-transitory computer readable medium of claim 8, the operation further comprises:
   preventing access to the suspected domain name in response to the assigning the second non-zero likelihood.

21. The system of claim 7 wherein the personal information comprises one or more of a username, a password, a credit card number, an account number, a date of birth, a social security number, and a full name.

22. The system of claim 7 wherein the compute comprises extract first hypertext markup language (HTML) text from the first webpage of the and second HTML text from the second webpage to generate respective first and second word lists; and compare word counts associated with the first and second word lists.

23. The system of claim 7 wherein the character string is entered into a browser associated with a client in a network environment through one of a manual entry from a keyboard and an automatic entry from a hyperlink.

24. The system of claim 7 wherein the generate comprises substitute the identified character with the corresponding legitimate character.

25. The system of claim 24, the processor to:
   determining the characters substituted in the suspected domain name to resemble the alternate domain name; and
   communicating the substituted characters to a separate device for use in evaluating subsequent suspected domain names.

26. The system of claim 7, the processor to:
   prevent access to the suspected domain name in response to the assigning the second non-zero likelihood.

\* \* \* \* \*